(12) United States Patent
Kikuchi et al.

(10) Patent No.: US 11,104,824 B2
(45) Date of Patent: Aug. 31, 2021

(54) CURABLE COMPOSITION AND SHAPED PRODUCT

(71) Applicant: DAICEL CORPORATION, Osaka (JP)

(72) Inventors: Shinji Kikuchi, Amagasaki (JP); Nobuhiko Harada, Amagasaki (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/056,983

(22) Filed: Aug. 7, 2018

(65) Prior Publication Data

US 2018/0346759 A1 Dec. 6, 2018

Related U.S. Application Data

(62) Division of application No. 14/672,635, filed on Mar. 30, 2015.

(30) Foreign Application Priority Data

Mar. 31, 2014 (JP) .................................. 2014-072693

(51) Int. Cl.
| | | |
|---|---|---|
| C09D 183/04 | (2006.01) | |
| C09D 7/47 | (2018.01) | |
| C09D 5/00 | (2006.01) | |
| C09D 183/06 | (2006.01) | |
| C08G 77/14 | (2006.01) | |
| C09D 5/16 | (2006.01) | |

(52) U.S. Cl.
CPC ............. *C09D 183/04* (2013.01); *C09D 5/00* (2013.01); *C09D 7/47* (2018.01); *C09D 183/06* (2013.01); *C08G 77/14* (2013.01); *C09D 5/16* (2013.01); *Y10T 428/31663* (2015.04)

(58) Field of Classification Search
CPC .......... C09D 183/04; C09D 7/47; C09D 5/00; C09D 183/06; C09D 5/16; Y10T 428/31663; C08G 77/14
See application file for complete search history.

(56) References Cited

U.S. PATENT DOCUMENTS

| | | | | |
|---|---|---|---|---|
| 6,099,971 A | * | 8/2000 | Faris | ........................ B05D 7/53 106/287.16 |
| 2005/0277755 A1 | | 12/2005 | Hamada et al. | |
| 2009/0269697 A1 | | 10/2009 | Kato et al. | |
| 2013/0026044 A1 | | 1/2013 | Yasuda et al. | |
| 2014/0326980 A1 | | 11/2014 | Suzuki et al. | |

FOREIGN PATENT DOCUMENTS

| | | |
|---|---|---|
| CN | 101974227 A | 2/2011 |
| CN | 103649217 A | 3/2014 |
| JP | 3-189182 A | 8/1991 |
| JP | 2005-262597 A | 9/2005 |
| JP | 2005-352110 A | 12/2005 |
| JP | 2009-209260 A | 9/2009 |
| JP | 2009-263522 A | 11/2009 |
| JP | 20099-279840 A | 12/2009 |
| JP | 2010-222400 A | 10/2010 |
| JP | 5136777 B2 † | 2/2013 |
| JP | 5138861 B2 † | 2/2013 |
| JP | 2013-47786 A | 3/2013 |
| JP | 2013-257471 A | 12/2013 |
| KR | 20140004568 A † | 1/2014 |
| KR | 10-2014-0034777 A | 3/2014 |
| TW | 201339246 A | 10/2013 |
| WO | WO 2013/011832 A1 | 1/2013 |

OTHER PUBLICATIONS

Limin et al, "CN101974227A—English Translation," 2010, SIPO, pp. 1-7 (Year: 2010).*
3M(TM) Corporation, "3M(TM) Novec(TM) Fluorosurfactant FC-4430," 3M(TM) Corporation, 2011, pp. 1-4 (Year: 2011).*
Advisory Action, dated Jul. 18, 2018, issued in U.S. Appl. No. 14/672,635.
Chinese Office Action and Chinese Search Report, dated Nov. 2, 2016, for Chinese Application No. 201510140488.2, with an English translation of the Chinese Office Action.
Final Office Action, dated Mar. 17, 2018 issued in U.S. Appl. No. 14/672,635.
Japanese Office Action, dated Dec. 19, 2017 for corresponding Japanese Application No. 2014-072693, with English translation.
Japanese Office Action, dated May 23, 2017, for corresponding Japanese Application No. 2014-072693.
Non-Final Office Action, dated Aug. 25, 2017 issued in U.S. Appl. No. 14/672,635.
Osswald et al., "Material Science of Polymers for Engineers," Dec. 2012, Third Edition, pp. 49-82.
PCI, "BYK®-3550 Awarded the BYK Advance Innovation Prize," Jun. 13, 2010, Paint and Coating Industry.
Taiwanese Office Action and Search Report, dated Oct. 3, 2018, for corresponding Taiwanese Application No. 104109476, along with an English translation.
Korean Office Action, dated Oct. 23, 2020, for corresponding Korean Application No. 10-2015-0042270, with an English machine translation.

\* cited by examiner
† cited by third party

*Primary Examiner* — Maria V Ewald
*Assistant Examiner* — Ethan Weydemeyer
(74) *Attorney, Agent, or Firm* — Birch, Stewart, Kolasch & Birch, LLP

(57) ABSTRACT

A shaped product comprising a hardcoat layer, wherein the hardcoat layer is a cured product of a curable composition comprising a cationic curable silicone resin and a leveling agent, the cationic curable silicone resin comprising a silsesquioxane unit, having a monomer unit having an epoxy group in a proportion of not less than 50% by mol in a total monomer unit, and having a number average molecular weight of 1000 to 3000.

9 Claims, No Drawings

CURABLE COMPOSITION AND SHAPED PRODUCT

This application is a Divisional of U.S. application Ser. No. 14/672,635, filed on Mar. 30, 2015, which claims priority under 35 U.S.C. 119(a) to Japanese Patent Application No. 2014-072693, filed on Mar. 31, 2014, the contents of all of which are incorporated by reference, in their entirety, into the present application.

TECHNICAL FIELD

The present invention relates to a curable composition (a hardcoat liquid or a hardcoat agent) useful for a hardcoat film having desired abrasion resistance, transparency, or other properties or a hardcoat sheet as a glass substitute. The present invention also relates to a shaped product obtainable by curing the composition.

BACKGROUND ART

Glass is known as a material having a very large surface hardness. For example, a glass having a surface pencil hardness increased to 9H by an alkali ion exchange treatment is also known. Unfortunately, the alkali ion exchange treatment of glass, which produces alkali waste fluids in large quantities, has a large burden on the environment. Further, the glass is fragile due to a large specific gravity and a low flexibility thereof. Thus since the glass fails to be produced or processed by a roll-to-roll system and is necessarily produced or processed in the form of a sheet, the production efficiency is low.

A plastic material, such as a polyester, has an excellent flexibility, although the plastic material has a small surface hardness. Thus the plastic material is easily scratched and has a low abrasion resistance. In order to protect the plastic material from scratches, a curable resin (such as a photocurable resin) is applied on a surface of a plastic substrate and cured to form a hardcoat layer having a large hardness. The applications of the hardcoat film having a hardcoat layer are now expanding. According to the purposes, the hardcoat film may be required to have a surface hardness or a heat resistance equivalent to a glass.

Japanese Patent Application Laid-Open Publication No. 2005-262597 (JP-2005-262597A, Patent Document 1) discloses a hardcoat film that is excellent in abrasion resistance and sliding property and is used for a pen input side of a pen input transparent touch panel. The hardcoat film has a substrate film and a coat layer on at least one side of the substrate film; the coat layer consists of a resin composition containing 0.1 to 10 parts by weight of an ultraviolet-curable silicone resin having a molecular weight of 500 to 20000 relative to 100 parts by weight of an ultraviolet-curable acrylate resin. In this document, as the ultraviolet-curable silicone resin, a radical-polymerization type resin and a cationic polymerization type resin are described; as the cationic polymerization type resin, a polydimethylsiloxane having an epoxypropoxypropyl end and an (epoxycyclohexylethyl)methylsiloxane-dimethylsiloxane copolymer are exemplified. This document also discloses that the ultraviolet-curable silicone resin preferably has a molecular weight of 500 to 20000 in order to express a pen-sliding property. In Examples of this document, the hardcoat layer formed has a pencil hardness of 3H.

Japanese Patent Application Laid-Open Publication No. 2009-279840 (JP-2009-279840A, Patent Document 2) discloses a laminate containing a first cured resin layer having a pencil hardness of not higher than HB and a thickness of 10 to 200 μm and a second cured resin layer having a pencil hardness of not lower than H and a thickness of 2 to 50 μm, wherein the first cured resin layer is obtained by curing a first radiation-curable resin composition, and the second cured resin layer is obtained by curing a second radiation-curable resin composition. This document discloses a radical-polymerizable monomer and a radical-polymerizable oligomer as a radiation-curable resin. In Examples of this document, the second cured resin layer formed has a pencil hardness of 4H.

Unfortunately, these cured resin layers have insufficient abrasion resistance. Generally, a hardcoat layer obtained by radical polymerization of a polyfunctional acrylic monomer has a pencil hardness of about 3H, although a higher hardness is required depending on applications. In order to increase the hardness of the hardcoat layer, it is possible to make the crosslinking density higher by increasing the number of functional groups in the curable resin or to increase the thickness of the hardcoat layer. Unfortunately, the resulting hardcoat layer curls or cracks due to contraction generated by hardening. Moreover, although there is also a method for increasing the hardness of the hardcoat layer by addition of an inorganic fine particle, it is difficult to prepare a layer having specific properties according to applications. For example, it is difficult to select a material for a hardcoat layer to be used in an optical application that requires a high transparency. For optical and other applications, it is also known that a fluorine-containing leveling agent is added in order to improve the surface smoothness or the antifouling property. Unfortunately, the addition of the fluorine-containing material tends to decrease the abrasion resistance.

RELATED ART DOCUMENTS

Patent Documents

Patent Document 1: JP-2005-262597A (Claim 1, paragraphs [0016], [0023], and [0024], and Examples)

Patent Document 2: JP-2009-279840A (Claim 1, paragraph [0018], Examples)

SUMMARY OF INVENTION

Technical Problem

It is therefore an object of the present invention to provide a curable composition (a hardcoat liquid or a hardcoat agent) for obtaining a cured product having improved surface hardness and abrasion resistance, and a shaped product obtainable by curing the composition.

Another object of the present invention is to provide a curable composition for obtaining a cured product having an excellent surface smoothness, a high transparency, and an improved external appearance, and a shaped product obtainable by curing the composition.

It is still another object of the present invention to provide a curable composition of which even a thick cured product can be prevented from curling or cracking and can be produced efficiently, and a shaped product obtainable by curing the composition.

It is a further object of the present invention to provide a curable composition for obtaining a cured product having improved heat resistance, antifouling property, and sliding property, and a shaped product obtainable by curing the composition.

Solution to Problem

The inventors of the present invention made intensive studies to achieve the above objects and finally found that the combination use of a specific cationic curable silicone resin and a leveling agent improves surface hardness and abrasion resistance of a cured product thereof. The present invention was accomplished based on the above findings.

That is, an aspect of the present invention provides a curable composition (or a coating composition) comprising a cationic curable silicone resin and a leveling agent. The cationic curable silicone resin comprises a silsesquioxane unit, has a monomer unit having an epoxy group in a proportion of not less than 50% by mol in a total monomer unit, and has a number average molecular weight of 1000 to 3000. The cationic curable silicone resin may have a silsesquioxane unit represented by the formula (1): $R^1SiO_{3/2}$ (wherein $R^1$ represents a group containing an epoxy group; a hydrogen atom; or a hydrocarbon group) in a proportion of not less than 50% by mol in the total monomer unit constituting the cationic curable silicone resin. The cationic curable resin may further comprise a unit represented by the formula (2): $R^1SiO(OR^2)$ (wherein $R^1$ represents a group containing an epoxy group; a hydrogen atom; or a hydrocarbon group; $R^2$ represents a hydrogen atom or a $C_{1-4}$alkyl group), and may have a molar ratio of the silsesquioxane unit relative to the unit represented by the formula (2) of not less than 5. The silsesquioxane unit may comprise a unit represented by the formula (3): $R^3SiO_{3/2}$ (wherein $R^3$ represents a group containing an alicyclic epoxy group) and a unit represented by the formula (4): $R^4SiO_{3/2}$ (wherein $R^4$ represents an aryl group which may have a substituent). The cationic curable silicone resin may have a molecular weight distribution Mw/Mn of about 1 to 3. The leveling agent may comprise a silicone-series leveling agent and/or a fluorine-containing leveling agent and have at least one of a reactive group to an epoxy group, and a hydrolytically condensable group. The leveling agent may have a proportion of about 0.1 to 10 parts by weight relative to 100 parts by weight of the cationic curable silicone resin. The leveling agent may comprise a silicone-series leveling agent having a hydroxyl group. The silicone-series leveling agent may have a proportion of about 0.5 to 5 parts by weight relative to 100 parts by weight of the cationic curable silicone resin.

Another aspect of the present invention provides a shaped product comprising a hardcoat layer that is a cured product of the curable composition. The shaped product may comprise the hardcoat layer alone and have an average thickness of 10 to 200 μm. The shaped product may further comprise a transparent substrate layer, and the transparent substrate layer may have a side provided with the hardcoat layer. The sheet-like shaped product (or shaped product sheet) may be produced by a roll-to-roll system. The shaped product may comprise the hardcoat layer and a three-dimensional base (or shaped article).

Advantageous Effects of Invention

According to the present invention, the combination use of a specific cationic curable silicone resin and a leveling agent improves surface hardness and abrasion resistance of a cured product thereof. The resin composition imparts an excellent surface smoothness, a high transparency, and an improved external appearance to a cured product of the composition. Moreover, even if the cured product is thick, the cured product, which has an excellent flexibility, is preventable from curling or cracking and producible by a roll-to-roll system; the production efficiency is improvable. Further, the cured product allows improvement in heat resistance, antifouling property, and sliding property. Thus, the cured product has an excellent durability even in a case where the cured product is used for an electric machine that generates heat. In addition, in a case where the cured product is stained with fingerprints or ink (pen mark), the stain is easily removed (wiped off) from the cured product.

DESCRIPTION OF EMBODIMENTS

[Curable Composition]

The curable composition of the present invention contains a cationic curable silicone resin and a leveling agent.

(Cationic Curable Silicone Resin)

The cationic curable silicone resin contains a silsesquioxane unit (a trifunctional T unit generally represented by $RSiO_{3/2}$). More specifically, the cationic curable silicone resin contains a silsesquioxane unit represented by the formula (1): $R^1SiO_{3/2}$ (wherein $R^1$ represents a group containing an epoxy group; a hydrogen atom; or a hydrocarbon group).

In the formula (1), the group containing an epoxy group, represented by $R^1$, may include a group containing a glycidyl group, or a group containing an alicyclic epoxy group.

The group containing a glycidyl group may include, for example, glycidyl group; and a glycidyloxy$C_{1-10}$alkyl group, such as glycidyloxymethyl, 2-glycidyloxyethyl, 3-glycidyloxypropyl, or 4-glycidyloxybutyl (in particular, a glycidyloxy$C_{1-4}$alkyl group).

As the group containing an alicyclic epoxy group, there may be mentioned an epoxy$C_{5-12}$cycloalkyl-straight- or branched-chain $C_{1-10}$alkyl group, for example, an epoxycyclopentyl$C_{1-10}$alkyl group, such as 2,3-epoxycyclopentylmethyl, 2-(2,3-epoxycyclopentyl)ethyl, 2-(3,4-epoxycyclopentyl)ethyl, or 3-(2,3-epoxycyclopentyl)propyl; an epoxycyclohexyl$C_{1-10}$alkyl group, such as 3,4-epoxycyclohexylmethyl, 2-(3,4-epoxycyclohexyl)ethyl, 3-(3,4-epoxycyclohexyl)propyl, or 4-(3,4-epoxycyclohexyl)butyl; and an epoxycyclooctyl$C_{1-10}$alkyl group, such as 4,5-epoxycyclooctylmethyl, 2-(4,5-epoxycyclooctyl)ethyl, or 3-(4,5-epoxycyclooctyl)propyl.

In the group containing an alicyclic epoxy group, the $C_{5-12}$cycloalkane ring may have a $C_{1-4}$alkyl group [such as methyl or ethyl (in particular, methyl group)] as a substituent. The group containing an alicyclic epoxy group having a substituent may include, for example, a $C_{1-4}$alkyl-epoxy$C_{5-12}$cycloalkyl-straight- or branched-chain $C_{1-10}$alkyl group, such as 4-methyl-3,4-epoxycyclohexylmethyl, 2-(3-methyl-3,4-epoxycyclohexyl)ethyl, 2-(4-methyl-3,4-epoxycyclohexyl)ethyl, 3-(4-methyl-3,4-epoxycyclohexyl)propyl, or 4-(4-methyl-3,4-epoxycyclohexyl)butyl.

These groups, each containing an epoxy group, may be used alone or in combination. Among them, in light of the hardness of the cured product, a preferred one includes a group containing an alicyclic epoxy group, particularly an epoxycyclohexyl-straight- or branched-chain $C_{1-4}$alkyl group which may have a $C_{1-4}$alkyl group (in particular, an epoxycyclohexyl$C_{2-4}$alkyl group, such as 3,4-epoxycyclohexylethyl).

In the formula (1), the hydrocarbon group represented by $R^1$ may include an alkyl group, an alkenyl group, a cycloalkyl group, a cycloalkenyl group, an aryl group, an aralkyl group, and others.

As the alkyl group, there may be mentioned, for example, a straight- or branched-chain $C_{1-10}$alkyl group, such as methyl, ethyl, propyl, isopropyl, n-butyl, isobutyl, s-butyl, t-butyl, or isopentyl.

The alkenyl group may include, for example, a straight- or branched-chain $C_{2-10}$alkenyl group, such as vinyl, allyl, or isopropenyl.

As the cycloalkyl group, there may be mentioned, for example, a $C_{4-12}$cycloalkyl group, such as cyclobutyl, cyclopentyl, or cyclohexyl.

The cycloalkenyl group may include a $C_{5-12}$cycloalkenyl group, such as cyclopentenyl or cyclohexenyl, and others.

As the aryl group, there may be mentioned, for example, a $C_{6-20}$aryl group, such as phenyl or naphthyl.

The aralkyl group may include a $C_{6-20}$aryl-$C_{1-4}$alkyl group, such as benzyl, phenethyl, or phenylpropyl, and others.

Each one of these hydrocarbon groups may have a substituent. The substituent may include, but should not be limited to, these hydrocarbon groups, an ether group, an ester group, a carbonyl group, a siloxane group, a halogen atom (such as a fluorine atom), a (meth)acryl group, a mercapto group, an amino group, and a hydroxyl group. Each one of the ether group, the ester group, the carbonyl group, and the siloxane group may be a linkage group. Among these substituents, a $C_{1-4}$alkyl group (such as methyl) and a $C_{6-20}$ aryl group (such as phenyl) are practically used.

These hydrocarbon groups may be used alone or in combination. Among these hydrocarbon groups, a preferred one includes an alkyl group, an alkenyl group, and an aryl group, particularly a $C_{6-20}$aryl group. The $C_{6-20}$aryl group may be a phenyl group which may have a substituent, such as methylphenyl (tolyl) or dimethylphenyl (xylyl). As the $C_{6-20}$ aryl group, phenyl group is practically used.

Moreover, in the formula (1), $R^1$ may be a combination of a plural kind of groups, for example, a combination of the group having an epoxy group and the hydrocarbon group.

Generally, a silsesquioxane having a complete cage structure (or a fully condensed silsesquioxane) is formed from only the above-mentioned silsesquioxane unit, designated as T3 unit. According to the present invention, it is preferred to use a cationic curable silicone resin further containing a unit represented by the formula (2): $R^1SiO(OR^2)$ (wherein $R^1$ represents a group containing an epoxy group; a hydrogen atom; or a hydrocarbon group; $R^2$ represents a hydrogen atom or a $C_{1-4}$alkyl group). The unit (2) is designated as T2 unit. According to the present invention, the combination of the T3 unit and the T2 unit in a specific ratio can form a silsesquioxane having an incomplete cage structure, and the resulting cured product has an improved hardness probably due to the incomplete cage structure.

In the formula (2), the group containing an epoxy group and the hydrocarbon group, each represented by $R^1$, may include the same epoxy group and hydrocarbon group as those in the formula (1). Preferred epoxy group and hydrocarbon group are also the same as those of the formula (1).

The $C_{1-4}$alkyl group represented by $R^2$ may include, for example, a $C_{1-4}$alkyl group, such as methyl, ethyl, propyl, or butyl. These alkyl groups may be used alone or in combination. Among these alkyl groups, a $C_{1-2}$alkyl group, such as methyl or ethyl (in particular, methyl group), is preferred.

The molar quantity of the T3 silsesquioxane unit (1) may be 5 times or more (for example, 5 to 20 times) as large as that of the T2 unit (2). For example, the molar quantity of the T3 silsesquioxane unit (1) is about 5 to 18 times, preferably about 6 to 16 times, and more preferably about 7 to 15 times (in particular, about 8 to 14 times) as large as that of the T2 unit (2). In a case where the molar ratio (the T3 unit/the T2 unit) is too small, the cured product may have a low hardness.

According to the present invention, for example, the molar ratio (the T3 unit/the T2 unit) can be determined by $^{29}$Si-NMR spectroscopy. Specifically, in $^{29}$Si-NMR spectrum, the signal (peak) of the silicon atom of the T3 unit and that of the T2 unit are shown at different positions (chemical shifts), and the integration (relative area) of the signal for each peak can give the above-mentioned ratio, the T3 unit/the T2 unit. More specifically, for example, in a case where the group $R^1$ of the formula (1) in the cationic curable silicone resin is 2-(3',4'-epoxycyclohexyl)ethyl group, the signal of the silicon atom of the T3 unit is shown in −64 to −70 ppm and the signal of the silicon atom of the T2 unit is shown in −54 to −60 ppm. Thus in this case, the above-mentioned ratio (the T3 unit/the T2 unit) can be given by calculating the ratio of the integration of the signal in −64 to −70 ppm (the T3 unit) relative to the integration of the signal in −54 to −60 ppm (the T2 unit). For example, the $^{29}$Si-NMR spectrum can be measured by the following apparatus and conditions.

Measuring apparatus: trade name "JNM-ECA500NMR" (manufactured by JEOL Ltd.)
Solvent: deuterochloroform
Number of integrations: 1800
Measuring temperature: 25° C.

According to the present invention, the silsesquioxane unit contains the unit (1). The silsesquioxane unit may contain a unit represented by the formula (3): $R^3SiO_{3/2}$ (wherein $R^3$ represents a group containing an alicyclic epoxy group) and a unit represented by the formula (4): $R^4SiO_{3/2}$ (wherein $R^4$ represents an aryl group which may have a substituent) in combination.

The cationic curable silicone resin may contain other monomer units (constitutional units of polyorganosiloxane) in addition to the T unit (i.e., the silsesquioxane unit (1) and the unit (2)). Examples of other monomer units may include a monofunctional M unit (a unit generally represented by $R^3SiO_{1/2}$), a difunctional D unit (a unit generally represented by $R^2SiO_{2/2}$), and a tetrafunctional Q unit (a unit generally represented by $SiO_{4/2}$). In each one of the M unit and the D unit, the organic group represented by R may include the same groups as those represented by $R^1$ of the formulae (1) and (2).

The cationic curable silicone resin contains the unit having an epoxy group (epoxy-containing unit) of not less than 50% by mol (e.g., about 50 to 100% by mol), preferably about 55 to 100% by mol (e.g., about 65 to 99.9% by mol), and more preferably about 80 to 99% by mol (e.g., about 90 to 98% by mol) in the total monomer unit [the total (100% by mol in total) of the M unit, the D unit, the T unit, and the Q unit constituting a polyorganosiloxane structure]. In a case where the ratio of the unit having an epoxy group is excessively small, the cured product has a low hardness.

The proportion of the T3 silsesquioxane unit (1) in the total monomer unit may be not less than 50% by mol, for example, about 60 to 99% by mol, preferably about 70 to 98% by mol, and more preferably about 80 to 95% by mol (particularly about 85 to 92% by mol). In a case where the proportion of the silsesquioxane unit is too small, the cured product may have a low hardness probably because it is difficult to form a silsesquioxane having an incomplete cage structure with a moderate molecular weight.

The total proportion of the silsesquioxane unit (1) and the unit (2) (the total proportion of the difunctional T3 and T2 units) in the total monomer unit is, for example, about 60 to 100% by mol, preferably about 70 to 100% by mol, and more preferably about 80 to 100% by mol (particularly about 90 to 100% by mol). In a case where the proportion of these units is too small, the cured product may have a low hardness probably because it is difficult to form a silsesquioxane having an incomplete cage structure with a moderate molecular weight.

The cationic curable silicone resin may have a cage structure (in particular, an incomplete cage structure). Whether the cationic curable silicone resin has a cage (in particular, an incomplete cage) silsesquioxane structure or not can be determined by FT-IR spectroscopy [reference: R. H. Raney, M. Itoh, A. Sakakibara and T. Suzuki, Chem. Rev. 95, 1409 (1995)]. Specifically, a cationic curable silicone resin having no intrinsic absorption peak at or near 1050 $cm^{-1}$ or at or near 1150 $cm^{-1}$ and having one intrinsic absorption peak at or near 1100 $cm^{-1}$ is identifiable as a resin having a cage (in particular, an incomplete cage) silsesquioxane structure; a cationic curable silicone resin having an absorption peak at or near 1050 $cm^{-1}$ and an absorption peak at or near 1150 $cm^{-1}$ is identifiable as a resin having a ladder silsesquioxane structure. According to the present invention, the FT-IR spectrum can be measured by the following apparatus and conditions.

Measuring apparatus: trade name "FT-720" (manufactured by Horiba, Ltd.)
Measuring method: transmission method
Resolution: 4 $cm^{-1}$
Measuring wave number range: 400 to 4000 $cm^{-1}$
Number of integrations: 16

For the molecular weight of the cationic curable silicone resin, the resin has a number average molecular weight (Mn) of about 1000 to 3000, preferably about 1000 to 2800, and more preferably about 1100 to 2600 (particularly about 1500 to 2500) in terms of standard polystyrene in a gel permeation chromatography. A cured product obtainable from a cationic curable silicone resin having an excessively small molecular weight has low abrasion resistance and a low heat resistance. A cationic curable silicone resin having an excessively large molecular weight has a low compatibility with other components in the composition, and thus a cured product obtainable from the resin has a low heat resistance.

For the molecular weight distribution (Mw/Mn) of the cationic curable silicone resin, for example, the resin has a molecular weight distribution (molecular weight dispersity) of about 1 to 3, preferably about 1.1 to 2, and more preferably about 1.2 to 1.9 (particularly about 1.3 to 1.8) in terms of standard polystyrene in a gel permeation chromatography. In a case where the molecular weight distribution is too large, the cured product may have a low hardness. In contrast, a cationic curable silicone resin having an excessively small molecular weight distribution may be hard to handle, because the resin has an increased viscosity or is in the solid state.

According to the present invention, the number average molecular weight and the molecular weight distribution of the cationic curable silicone resin can be measured by the following apparatus and conditions.

Measuring apparatus: trade name "LC-20AD" (manufactured by Shimadzu Corporation)
Column: Shodex KF-801 (two columns), KF-802, and KF-803 (manufactured by Showa Denko K.K.)
Measuring temperature: 40° C.
Eluent: THF, sample concentration of 0.1 to 0.2% by weight
Flow volume: 1 mL/minute Detector: UV-VIS detector (trade name "SPD-20A", manufactured by Shimadzu Corporation)
Molecular weight: in terms of standard polystyrene The 5% weight loss temperature ($T_{d5}$) of the cationic curable silicone resin under an atmosphere of air is not particularly limited to a specific one, and may be not lower than 330° C. (e.g., about 330 to 450° C.). The 5% weight loss temperature ($T_{d5}$) is preferably not lower than 340° C. (e.g., about 340 to 420° C.) and more preferably not lower than 350° C. (e.g., about 350 to 400° C.). In a case where the 5% weight loss temperature is too low, the cured product may have a low heat resistance. In particular, the 5% weight loss temperature can be adjusted to not lower than 330° C. by providing a cationic curable silicone resin having a T3/T2 unit molar ratio of not less than 5, a number average molecular weight of 1000 to 3000, a molecular weight distribution of 1 to 3, and one intrinsic peak at or near 1100 $cm^{-1}$ in FT-IR spectrum. The 5% weight loss temperature, at which 5% of the initial weight is lost under a constant rate of heating, is used as an index of the heat resistance. According to the present invention, the 5% weight loss temperature can be measured under an atmosphere of air at a heating rate of 5° C./minute by TGA (thermogravimetric analysis).

(Process for Producing Cationic Curable Silicone Resin)

The cationic curable silicone resin can be produced by a commonly used process for producing a polyorganosiloxane. The process is not particularly limited to a specific one. For example, the cationic curable silicone resin may be produced by hydrolytically condensing one or more monomers (hydrolyzable silane compounds). As each one of the hydrolyzable silane compounds, there may be used a compound corresponding to each one of the units described above.

Specifically, a monomer represented by $R^1SiX_3$ may be used as a monomer corresponding to the T unit represented by the formula (1) or (2); a monomer represented by $(R^1)_3SiX$ may be used as a monomer corresponding to the M unit; a monomer represented by $(R^1)_2SiX_2$ may be used as a monomer corresponding to the D unit; a monomer represented by $SiX_4$ may be used as a monomer corresponding to the Q unit. Among these monomers, at least the monomer corresponding to the T unit is used. According to an object structure, the monomer may be used in combination with other monomers.

In the formulae of the monomers described above, $R^1$ is the same as R of the formula (1), and X represents a hydrolytically condensable group. The hydrolytically condensable group represented by X may include, for example, a halogen atom (such as fluorine, chlorine, bromine, or iodine atom) and an alkoxy group (e.g., a $C_{1-4}$alkoxy group, such as methoxy or ethoxy). Among them, a $C_{1-2}$alkoxy group (in particular, methoxy group) is practically used.

In a case where two or more monomers are used in combination, these hydrolyzable silane compounds may be hydrolytically condensed simultaneously or consecutively. For the consecutive reaction, the order of reactions is not particularly limited to a specific one.

The hydrolytic condensation of each one of the hydrolyzable silane compounds may be carried out in the absence of a solvent. The hydrolytic condensation is preferably carried out in the presence of a solvent. The solvent may include, for example, an aromatic hydrocarbon (such as benzene, toluene, xylene, or ethylbenzene); an ether (such as diethyl ether, dimethoxyethane, tetrahydrofuran, or dioxane); a ketone (such as acetone, methyl ethyl ketone, or methyl isobutyl ketone); an ester (such as methyl acetate, ethyl acetate, isopropyl acetate, or butyl acetate); an amide (such as N,N-dimethylformamide or N,N-dimethylacetamide); a nitrile (such as acetonitrile, propionitrile, or benzonitrile); and an alcohol (such as methanol, ethanol, isopropyl alcohol, or butanol). These solvents may be used alone or in combination. Among these solvents, a ketone (such as acetone) and an ether (such as dioxane) are preferred.

The amount of the solvent is not particularly limited to a specific one. The amount of the solvent can be selected from the range of about 0 to 2000 parts by weight (for example, about 100 to 1000 parts by weight) relative to 100 parts by weight of the total monomer according to the reaction time or other factors.

The hydrolytic condensation of the hydrolyzable silane compound may proceed in the presence of a catalyst and water. The catalyst may be an acid catalyst or may be an alkaline catalyst. The acid catalyst may include, for example, a mineral acid (such as hydrochloric acid, sulfuric acid, nitric acid, phosphoric acid, or boric acid); a phosphate ester; a carboxylic acid (such as formic acid, acetic acid, or trifluoroacetic acid); a sulfonic acid (such as methanesulfonic acid, trifluoromethanesulfonic acid, or p-toluenesulfonic acid); a solid acid (such as active clay); and a Lewis acid (such as iron chloride). The alkaline catalyst may include, for example, an alkali metal hydroxide (such as sodium hydroxide or potassium hydroxide); an alkaline earth metal hydroxide (such as magnesium hydroxide or calcium hydroxide); an alkali metal carbonate (such as sodium carbonate or potassium carbonate); an alkaline earth metal carbonate (such as magnesium carbonate); an alkali metal hydrogencarbonate (such as sodium hydrogencarbonate or potassium hydrogencarbonate); a salt of an organic acid with an alkali metal (such as sodium acetate or potassium acetate); a salt of an organic acid with an alkaline earth metal (such as magnesium acetate); an alkali metal alkoxide (such as sodium methoxide or sodium ethoxide); an alkali metal phenoxide (such as sodium phenoxide); an amine (such as triethylamine, N-methylpiperidine, 1,8-diazabicyclo[5.4.0]undeca-7-ene, or 1,5-diazabicyclo[4.3.0]nona-5-ene); and a nitrogen-containing aromatic heterocyclic compound (such as pyridine, 2,2'-bipyridyl, or 1,10-phenanthroline). These catalysts may be used alone or in combination. These catalysts may be used in a state dissolved or dispersed in water or a solvent.

The amount to be used of the solvent is not particularly limited to a specific one. The amount of the solvent may selected from the range of about 0.002 to 0.2 mol (in particular, about 0.005 to 0.1 mol) relative to 1 mol of the total amount of the hydrolyzable silane compound.

The amount to be used of water is not particularly limited to a specific one. The amount of water may be selected from the range of about 0.5 to 20 mol (for example, about 1 to 15 mol) relative to 1 mol of the total amount of the hydrolyzable silane compound. The method of adding water is not particularly limited to a specific one. The total amount (the total amount to be used) of water may be added at a time or stepwise. The stepwise addition may be continuous or intermittent.

For the reaction conditions of the hydrolytic condensation, it is preferred to select the reaction conditions by which a cationic curable silicone resin having the above-mentioned constitutional units is obtainable. The reaction temperature of the hydrolytic condensation is not particularly limited to a specific one and, for example, is about 40 to 100° C. (in particular, about 45 to 80° C.). The control of the reaction temperature within this range efficiently allows easy adjustment of the constitutional unit of the resin to the above-mentioned range. The reaction time is not particularly limited to a specific one and, for example, is about 0.1 to 10 hours (in particular, about 1.5 to 8 hours). The reaction may be carried out under an atmospheric pressure or may be carried out under an applied pressure or a reduced pressure. The atmosphere of the reaction may include, but should not be limited to, an active gas atmosphere containing oxygen (such as air), preferably an inactive gas atmosphere (such as nitrogen or argon).

The hydrolytic condensation of the hydrolyzable silane compound provides a polyorganosiloxane (silicone resin) containing a polyorganosilsesquioxane unit. After the completion of the hydrolytic condensation, the catalyst is preferably neutralized in order to inhibit the opening of the epoxy group of the resin. Moreover, the resulting silicone resin may be separated and purified by, for example, a separation means, such as water washing, acid washing, alkali washing, filtration, concentration, distillation, extraction, crystallization, recrystallization, or column chromatography, or a combination thereof.

(Leveling Agent)

As the leveling agent, there may be used a commonly used leveling agent (e.g., an ethylene oxide adduct of acetylene glycol) as far as the leveling agent has a capability to reduce a surface tension. In light of an excellent capability to reduce a surface tension, the leveling agent may preferably include a silicone-series leveling agent and a fluorine-containing leveling agent. According to the present invention, the combination use of the cationic curable silicone resin and the leveling agent allows the improvement of the surface smoothness, the transparency or luster (external appearance), the sliding property, and others. Not only does the use of a specific leveling agent allow the maintenance of the hardness or abrasion resistance, but the control of the blending ratio also allows the improvement of the hardness or abrasion resistance.

The silicone-series leveling agent includes a leveling agent having a polyorganosiloxane skeleton. As the polyorganosiloxane skeleton, there may be used a polyorganosiloxane having the M unit, the D unit, the T unit, and/or the Q unit, as with the cationic curable silicone resin. Generally, a polyorganosiloxane having the D unit is used. The polyorganosiloxane may have an organic group (R) selected from among the hydrocarbon groups exemplified as the group $R^1$ of the formula (1) of the cationic curable silicone resin. The organic group R usually includes a $C_{1-4}$alkyl group and/or an aryl group, preferably methyl group and/or phenyl group (in particular, methyl group). The repeating number of siloxane units (the degree of polymerization) is, for example, about 2 to 3000, preferably about 3 to 2000, and preferably about 5 to 1000.

The fluorine-containing leveling agent includes a leveling agent having a fluoroaliphatic hydrocarbon skeleton. As the fluoroaliphatic hydrocarbon skeleton, for example, there may be mentioned a fluoro$C_{1-10}$alkane, such as fluoromethane, fluoroethane, fluoropropane, fluoroisopropane, fluorobutane, fluoroisobutane, fluoro-t-butane, fluoropentane, or fluorohexane.

Each one of these fluoroaliphatic hydrocarbon skeletons has one or more fluorine atoms substituted in place of one or more hydrogen atoms on the parent skeleton. In order to improve the abrasion resistance, the sliding property, and the antifouling property, a perfluoroaliphatic hydrocarbon skeleton, in which all hydrogen atoms on the parent skeleton are replaced with fluorine atoms, is preferred.

The fluoroaliphatic hydrocarbon skeleton may have a polyfluoroalkylene ether skeleton, which is a repeating unit through an ether bond. The fluoroaliphatic hydrocarbon group as the repeating unit may be at least one member selected from the group consisting of fluoroC$_{1-4}$alkylene groups, for example, fluoromethylene, fluoroethylene, fluoropropylene, and fluoroisopropylene. These fluoroaliphatic hydrocarbon groups may be the same or different from each other. The repeating number of fluoroalkylene ether units (the degree of polymerization) may be, for example, about 10 to 3000, preferably about 30 to 1000, and more preferably about 50 to 500.

Among these skeletons, the polyorganosiloxane skeleton is preferred in light of the excellent affinity with the cationic curable silicone resin.

In order to impart various functions to the cationic curable silicone resin, the leveling agent having such a skeleton may have a functional group (such as a hydrolytically condensable group, or a reactive group to an epoxy group), a radical-polymerizable group, a polyether group, a polyester group, and/or a polyurethane group. The silicone-series leveling agent may have a fluoroaliphatic hydrocarbon group, or the fluorine-containing leveling agent may have a polyorganosiloxane group.

The hydrolysable group may include, for example, hydroxysilyl group; a trihalosilyl group (such as trichlorosilyl); a dihaloC$_{1-4}$alkylsilyl group (such as dichloromethylsilyl); a dihaloaryl group (such as dichlorophenylsilyl); a halodiC$_{1-4}$alkylsilyl group (e.g., a chlorodiC$_{1-4}$alkylsilyl, such as chlorodimethylsilyl); a triC$_{1-4}$alkoxysilyl group (such as trimethoxysilyl or triethoxysilyl); a diC$_{1-4}$alkoxyC$_{1-4}$alkylsilyl group (such as dimethoxymethylsilyl or diethoxymethylsilyl); a diC$_{1-4}$alkoxyarylsilyl group (such as dimethoxyphenylsilyl or diethoxyphenylsilyl); a C$_{1-4}$alkoxydiC$_{1-4}$alkylsilyl group (such as methoxydimethylsilyl or ethoxydimethylsilyl); a C$_{1-4}$alkoxydiarylsilyl group (such as methoxydiphenylsilyl or ethoxydiphenylsilyl); and a C$_{1-4}$alkoxyC$_{1-4}$alkylarylsilyl group (such as methoxymethylphenylsilyl or ethoxymethylphenylsilyl). Among them, a preferred one includes a triC$_{1-4}$alkoxysilyl group, such as trimethoxysilyl group, in light of the reactivity or others.

The reactive group to an epoxy group may include, for example, a hydroxyl group, an amino group, a carboxyl group, an acid anhydride group (such as maleic anhydride group), and an isocyanate group. Among them, a group to be widely used includes a hydroxyl group, an amino group, an acid anhydride group, and an isocyanate group in light of the reactivity or others. In view of easiness of handling or obtaining, a hydroxyl group is preferred.

The radical-polymerizable group may include, for example, a (meth)acryloyloxy group and a vinyl group. Among them, a (meth)acryloyloxy group is practically used.

As the polyether group, for example, there may be mentioned a polyoxyC$_{2-4}$alkylene group, such as a polyoxyethylene group, a polyoxypropylene group, a polyoxybutylene group, or a polyoxyethylene-polyoxypropylene group. In the polyether group, the repeating number of oxyalkylene groups (the mole number of oxyalkylene groups added) is, for example, about 2 to 1000, preferably about 3 to 100, and preferably about 5 to 50. Among them, a preferred one includes a polyoxyC$_{2-3}$alkylene group, such as a polyoxyethylene or a polyoxypropylene (in particular, a polyoxyethylene group).

The polyester group may include, for example, a polyester group obtainable by a reaction of a dicarboxylic acid [e.g., an aromatic carboxylic acid (such as terephthalic acid) or an aliphatic carboxylic acid (such as adipic acid)] and a diol (e.g., an aliphatic diol, such as ethylene glycol) and a polyester group obtainable by a ring opening polymerization of a circular ester (e.g., a lactone, such as caprolactone).

The polyurethane group may include, for example, a commonly used polyester-based polyurethane group and a polyether-based polyurethane group.

Each one of these functional groups may be introduced into the polyorganosiloxane skeleton or the fluoroaliphatic hydrocarbon skeleton by a direct bonding or through a linkage group (for example, an alkylene group, a cycloalkylene group, an ether group, an ester group, an amide group, a urethane group, or a linkage group having a plurality of the above-mentioned groups).

Among these functional groups, a preferred one includes a hydrolytically condensable group and a reactive group to an epoxy group in the respect that the functional group can be allowed to react with the cationic curable silicone resin to improve the hardness of the cured product. The reactive group to an epoxy group (in particular, hydroxyl group) is particularly preferred.

The hydroxyl group may be a terminal hydroxyl group of a (poly)oxyalkylene group [such as a (poly)oxyethylene group]. The leveling agent having a hydroxyl group may include, for example, a silicone-series leveling agent (e.g., a polydimethylsiloxanepolyoxyethylene) having a (Poly)oxyC$_{2-3}$alkylene group (such as a (poly)oxyethylene group) on a side chain of a polyorganosiloxane skeleton (such as a polydimethylsiloxane); and a fluorine-containing leveling agent (e.g., a fluoroalkylpolyoxyethylene) having a fluoroaliphatic hydrocarbon group on a side chain of a (poly)oxyC$_{2-3}$alkylene skeleton (such as a (poly)oxyethylene).

As the silicone-series leveling agent, there may be used a commercially available silicone-series leveling agent. The commercially available silicone-series leveling agent may include, for example, a BYK series leveling agent manufactured by BYK Japan KK (e.g., "BYK-300", "BYK-301/302", "BYK-306", "BYK-307", "BYK-310", "BYK-315", "BYK-313", "BYK-320", "BYK-322", "BYK-323", "BYK-325", "BYK-330", "BYK-331", "BYK-333", "BYK-337", "BYK-341", "BYK-344", "BYK-345/346", "BYK-347", "BYK-348", "BYK-349", "BYK-370", "BYK-375", "BYK-377", "BYK-378", "BYK-UV3500", "BYK-UV3510", "BYK-UV3570", "BYK-3550", "BYK-SILCLEAN3700", and "BYK-SILCLEAN3720"), an AC series leveling agent manufactured by Algin Chemie (e.g., "AC FS180", "AC FS360", and "AC S20"), a POLYFLOW series leveling agent manufactured by Kyoeisha Chemical Co., Ltd. (e.g., "POLYFLOW KL-400X", "POLYFLOW KL-400HF", "POLYFLOW KL-401", "POLYFLOW KL-402", "POLYFLOW KL-403", and "POLYFLOWKL-404"), a KP series leveling agent manufactured by Shin-Etsu Chemical Co., Ltd. (e.g., "KP-323", "KP-326", "KP-341", "KP-104", "KP-110", and "KP-112"), and a leveling agent manufactured by Dow Corning Toray Co., Ltd. (e.g., "LP-7001", "LP-7002", "8032ADDITIVE", "57ADDITIVE", "L-7604", "FZ-2110", "FZ-2105", "67ADDITIVE", "8618ADDITIVE", "3ADDITIVE", and "56ADDITIVE").

As the fluorine-containing leveling agent, there may be used a commercially available fluorine-containing leveling agent. The commercially available fluorine-containing leveling agent may include, for example, an OPTOOL series leveling agent manufactured by Daikin Industries, Ltd. ("DSX", "DAC-HP"), a SURFLON series leveling agent manufactured by AGC Seimi Chemical Co., Ltd. (e.g., "S-242", "S-243", "S-420", "S-611", "S-651", and "S-386"), a BYK series leveling agent manufactured by BYK Japan KK (e.g., "BYK-340"), an AC series leveling agent manufactured by Algin Chemie (e.g., "AC 110a" and "AC 100a"), a MEGAFACE series leveling agent manufactured by DIC Corporation (e.g., "MEGAFACE F-114", "MEGAFACE F-410", "MEGAFACE F-444", "MEGAFACE EXP TP-2066", "MEGAFACE F-430", "MEGAFACE F-472SF", "MEGAFACE F-477", "MEGAFACE F-552", "MEGAFACE F-553", "MEGAFACE F-554", "MEGAFACE F-555", "MEGAFACE R-94", "MEGAFACE RS-72-K", "MEGAFACE RS-75", "MEGAFACE F-556", "MEGAFACE EXP TF-1367", "MEGAFACE EXP TF-1437", "MEGAFACE F-558", and "MEGAFACE EXP TF-1537", a FC series leveling agent manufactured by Sumitomo 3M Limited (e.g., "FC-4430" and "FC-4432"), a FTERGENT series leveling agent manufactured by Neos Company Limited (e.g., "FTERGENT 100", "FTERGENT 100C", "FTERGENT 110", "FTERGENT 150", "FTERGENT 150CH", "FTERGENT A-K", "FTERGENT 501", "FTERGENT 250", "FTERGENT 251", "FTERGENT 222F", "FTERGENT 208G", "FTERGENT 300", "FTERGENT 310", and "FTERGENT 400SW"), and a PF series leveling agent manufactured by Kitamura Chemicals Co., Ltd. (e.g., "PF-136A", "PF-156A", "PF-151N", "PF-636", "PF-6320", "PF-656", "PF-6520", "PF-651", "PF-652", and "PF-3320").

These leveling agents may be used alone or in combination. For example, a plural kind of the silicone-series leveling agents may be used in combination, a plural kind of the fluorine-containing leveling agents may be used in combination, or the silicone-series leveling agent and the fluorine-containing leveling agent may be used in combination. Among these leveling agents, a silicone-series leveling agent having a hydroxyl group is preferred, since the leveling agent has an excellent affinity with the cationic curable silicone resin, can be allowed to react with an epoxy group, and can improve the hardness or external appearance of the cured product.

The silicone-series leveling agent having a hydroxyl group may include, for example, a polyether-modified polyorganosiloxane, in which a main chain or side chain of a polyorganosiloxane skeleton (such as a polydimethylsiloxane) has a polyether group; a polyester-modified polyorganosiloxane, in which a main chain or side chain of a polyorganosiloxane skeleton has a polyester group; and a silicone-modified (meth)acrylic resin, in which a (meth)acrylic resin is modified with a polyorganosiloxane. For each one of these leveling agents, the poly organosiloxane skeleton may have a hydroxyl group, or the polyether group, the polyester group, or the (meth)acryloyl group may have a hydroxyl group. As the leveling agent, for example, there may be used "BYK-370", "BYK-SILCLEAN3700", "BYK-SILCLEAN3720" manufactured by BYK Japan KK.

The ratio of the leveling agent relative to 100 parts by weight of the cationic curable silicone resin can be selected from the range of about 0.01 to 20 parts by weight, and, for example, is about 0.05 to 15 parts by weight, preferably about 0.1 to 10 parts by weight, and more preferably about 0.2 to 5 parts by weight. The leveling agent in an excessively small ratio may decrease the surface smoothness of the cured product. The leveling agent in an excessively large ratio may decrease the hardness of the cured product.

In particular, the ratio of the silicone-series leveling agent relative to 100 parts by weight of the cationic curable silicone resin may be, for example, about 0.1 to 10 parts by weight, preferably about 0.2 to 5 parts by weight (e.g., about 0.3 to 3 parts by weight), and more preferably about 0.5 to 2 parts by weight (particularly about 0.8 to 1.5 parts by weight). The ratio of the fluorine-containing leveling agent relative to 100 parts by weight of the cationic curable silicone resin may be, for example, about 0.05 to 5 parts by weight, preferably about 0.1 to 3 parts by weight (e.g., about 0.15 to 2 parts by weight), and more preferably about 0.2 to 1 part by weight (particularly about 0.3 to 0.8 parts by weight). The ratio adjustment of the leveling agent within such a range can improve not only the surface smoothness of the cured product but also the hardness of the cured product; it has not been expected before that the leveling agent improves the hardness of the cured product.

(Cationic Polymerization Initiator)

The curable composition of the present invention preferably further contains a cationic polymerization initiator (an acid generator) in order to promote the polymerization and improve the hardness of the cured product. As the cationic polymerization initiator, there may be used a commonly used photoacid generator or a commonly used thermal acid generator, according to the kind of the polymerization.

The photoacid generator may include, for example, a sulfonium salt (a salt of a sulfonium ion and an anion), an iodonium salt (a salt of an iodonium ion and an anion), a selenium salt (a salt of a selenium ion and an anion), an ammonium salt (a salt of an ammonium ion and an anion), a phosphonium salt (a salt of a phosphonium ion and an anion), and a salt of a transition metal complex ion and an anion. These photoacid generators may be used alone or in combination. Among these photoacid generators, an acid generator having a high acidity, e.g., a sulfonium salt, is preferred in light of the improvement of the reactivity and the improvement of the hardness of the cured product.

The sulfonium salt may include, for example, a triarylsulfonium salt [such as a triphenylsulfonium salt, a tri-p-tolylsulfonium salt, a tri-o-tolylsulfonium salt, a tris(4-methoxyphenyl)sulfonium salt, a 1-naphthyldiphenylsulfonium salt, a 2-naphthyldiphenylsulfonium salt, a tris(4-fluorophenyl)sulfonium salt, a tri-1-naphthylsulfonium salt, a tri-2-naphthylsulfonium salt, a tris(4-hydroxyphenyl)sulfonium salt, a diphenyl[4-(phenylthio)phenyl]sulfonium salt, or a 4-(p-tolylthio)phenyldi-(p-phenyl)sulfonium salt]; a diarylsulfonium salt (such as a diphenylphenacylsulfonium salt, a diphenyl-4-nitrophenacylsulfonium salt, a diphenylbenzylsulfonium salt, or a diphenylmethylsulfonium salt); a monoarylsulfonium salt (such as a phenylmethylbenzylsulfonium salt, a 4-hydroxyphenylmethylbenzylsulfonium salt, or a 4-methoxyphenylmethylbenzylsulfonium salt); and a trialkylsulfonium salt (such as a dimethylphenacylsulfonium salt, a phenacyltetrahydrothiophenium salt, or a dimethylbenzylsulfonium salt). These sulfonium salts may be used alone or in combination. Among these sulfonium salts, a triarylsulfonium salt is preferred.

The anion (counter ion) for forming a salt with a cation may include, for example, $SbF_6^-$, $PF_6^-$, $BF_4^-$, a fluoroalkylfluorophosphate ion [such as $(CF_3CF_2)_3PF_3^-$ or $(CF_3CF_2CF_2)_3PF_3^-$], $(C_6F_5)_4B^-$, $(C_6F_5)_4Ga^-$, a sulfonate anion (such as trifluoromethanesulfonate anion, pentafluoroethanesulfonate anion, nonafluorobutanesulfonate anion, methanesulfonate anion, benzenesulfonate anion, or p-toluenesulfonate anion), $(CF_3SO_2)_3C^-$, $(CF_3SO_2)_2N^-$, a perhalogenate ion, a halosulfonate ion, a sulfate ion, a carbonate ion, an aluminate ion, a hexafluorobismuthate ion, a carboxylate ion, an arylborate ion, a thiocyanate ion, and a nitrate ion. Among these anions, a fluoroalkylfluorophosphate ion is preferred in light of solubility and others.

As the photoacid generator, a commercially available photoacid generator may be used. The commercially available photoacid generator may include, for example, a photoacid generator manufactured by San-Apro Ltd., such as "HS-1", "HS-1A", "HS-1P", "HS-1N", "HS-1TF", "HS-1NF", "HS-1MS", "HS-1CS", "HS-1PC", "LW-S1", "LW-S1NF", "K1-S", "CPI-101A", "CPI-100P", or "CPI300PG".

The thermal acid generator may include, for example, an arylsulfonium salt, an aryliodonium salt, an allene-ion complex, a quaternary ammonium salt, an aluminum chelate, and a boron trifluoride amine complex. These thermal acid generators may be used alone or in combination. Among these thermal acid generators, an acid generator having a high acidity, e.g., an arylsulfonium salt, is preferred in light of the improvement of the reactivity and the improvement of the hardness of the cured product. As the anion, there may be mentioned anions as described in the photoacid generator. The anion may be an antimony fluoride ion, such as $SbF^6$.

As the thermal acid generator, a commercially available thermal acid generator may be used. The commercially available thermal acid generator may include, for example, a thermal acid generator manufactured by Sanshin Chemical Industry Co., Ltd. (such as "SAN-AID SI-60L", "SAN-AID SI-60S", "SAN-AID SI-80L", or "SAN-AID SI-100L") and a thermal acid generator manufactured by ADEKA Corporation (such as "SP-66" or "SP-77").

The ratio of the cationic polymerization initiator relative to 100 parts by weight of the cationic curable silicone resin can be selected from the range of about 0.01 to 10 parts by weight, and is, for example, about 0.05 to 5 parts by weight, preferably about 0.1 to 3 parts by weight, and more preferably about 0.3 to 2 parts by weight (particularly about 0.5 to 1.5 parts by weight). An excessively small ratio of the cationic polymerization initiator may decelerate the progress of the curing reaction, resulting in a low hardness of the cured product. An excessively large ratio of the cationic polymerization initiator may decrease the storage stability of the composition or may cause the coloration of the cured product.

(Other Additives)

The curable composition may contain another curable resin. Another curable resin may include, for example, an epoxy resin, an oxetane resin, and a vinyl ether resin. These curable resins may be used alone or in combination. Among these curable resins, an epoxy resin is preferred in view of reactivity, miscibility, and others. As the epoxy resin, there may be mentioned, for example, a glycidyl ether-based epoxy resin, a glycidyl ester-based epoxy resin, an alicyclic epoxy resin, a glycidylamine-based epoxy resin, and a long-chain aliphatic epoxy resin. Among these epoxy resins, an alicyclic epoxy resin is particularly preferred in light of a low viscosity and an excellent sliding property. The ratio of another curable resin relative to 100 parts by weight of the cationic curable silicone resin is about not more than 100 parts by weight, for example, about not more than 50 parts by weight (e.g., about 1 to 50 parts by weight), preferably about not more than 30 parts by weight (e.g., about 5 to 30 parts by weight).

The curable composition may contain a commonly used additive as far as the additive does not have a bad influence on abrasion resistance or transparency. The commonly used additive may include, for example, a curing agent (or a hardener) (e.g., an amine-series curing agent, a polyaminoamide-series curing agent, an acid anhydride-series curing agent, and a phenol-series curing agent), a curing accelerator (e.g., an imidazole compound, an alkali metal or alkaline earth metal alkoxide, a phosphine compound, an amide compound, a Lewis acid complex compound, a sulfur compound, a boron compound, and a condensable organic metal compound), a filler (e.g., an inorganic filler, such as titanium oxide or alumina), a stabilizer (e.g., an antioxidant, an ultraviolet absorber, a light stabilizer, and a heat stabilizer), a plasticizer, a lubricant, an antifoaming agent, an antistatic agent, and a flame retardant. These additives may be used alone or in combination. The ratio of the additive(s) relative to 100 parts by weight of the cationic curable silicone resin is about not more than 100 parts by weight, for example, about not more than 30 parts by weight (e.g., about 0.01 to 30 parts by weight) and preferably about not more than 10 parts by weight (e.g., about 0.1 to 10 parts by weight).

The curable composition may further contain an organic solvent, for example, a ketone (such as acetone, methyl ethyl ketone, methyl isobutyl ketone, or cyclohexanone), an ether (such as dioxane or tetrahydrofuran), an aliphatic hydrocarbon (such as hexane), an alicyclic hydrocarbon (such as cyclohexane), an aromatic hydrocarbon (such as benzene), a halocarbon (such as dichloromethane or dichloroethane), an ester (such as methyl acetate or ethyl acetate), water, an alcohol (such as ethanol, isopropanol, butanol, or cyclohexanol), a cellosolve (such as methyl cellosolve or ethyl cellosolve), a cellosolve acetate, and an amide (such as dimethylformamide or dimethylacetamide).

The curable composition may have a solid content weight of, for example, about 1 to 80% by weight, preferably about 5 to 50% by weight, and more preferably about 10 to 30% by weight.

[Shaped Product]

The shaped product of the present invention contains a hardcoat layer containing (or formed from) the cured product of the curable composition.

The shaped product of the present invention may contain the hardcoat layer alone. For example, the shaped product may be a thick sheet (a hardcoat sheet), which may be used as a substitute for glass. The hardcoat sheet may be used as a light-guiding sheet (a substitute for glass) useful for various optical applications due to excellent transparency and heat resistance, and others. Examples of the optical applications may include a television; a personal computer; a display (such as a liquid crystal display or an organic electroluminescent (EL) display) for a personal digital assistance (e.g., a game machine, a tablet computer, a smart phone, and a mobile phone); a solar cell; and a window of a vehicle (such as an automobile) or a building. The shaped product sheet may have an average thickness of, for example, not less than 10 µm (e.g., about 10 to 1000 µm), e.g., about 100 to 900 µm, preferably about 200 to 800 µm, and more preferably about 300 to 700 µm (particularly about 400 to 600 µm).

The shaped product of the present invention may comprise a two-dimensional or three-dimensional base (or shaped article) having the hardcoat layer directly or indirectly formed on a surface thereof.

The two-dimensional base (or shaped article) may be in the form of a film or a sheet. The film (or film-like base or substrate film) may have the hardcoat layer on at least one side thereof. The film may have the hardcoat layer on one side thereof or may have the hardcoat layer on each side thereof. The two-dimensional base may be formed from an organic material (such as a thermoplastic resin or a thermosetting resin) or an inorganic material (such as a metal, a glass, or a ceramics). As the base, a transparent substrate film (a transparent substrate layer) is preferred, since the hardcoat layer, which is a cured product of the curable composition of the present invention, has an excellent transparency.

The transparent substrate film is formed from a plastic. The plastic may be a thermosetting resin. The transparent substrate film for which the hardcoat layer is necessary is usually formed from a thermoplastic resin in practical cases. The thermoplastic resin may include, for example, an olefinic resin, a styrenic resin, a polyester-series resin, a polyamide-series resin, a vinyl chloride-series resin, a polycarbonate-series resin, a poly(vinyl alcohol)-series resin, a polyimide-series resin, a polysulfone-series resin, a poly (phenylene ether)-series resin, a poly(phenylene sulfide)-series resin, a cellulose ester-series resin, and a fluorine-containing resin. These plastics may be used alone or in combination. Among these plastics, in light of well-balanced properties, such as transparency and mechanical properties, a preferred one includes a polyester-series resin [e.g., a homo- or co-poly(alkylene arylate)-series resin containing a $C_{2-4}$alkylene$C_{6-12}$arylate unit, such as a poly(ethylene terephthalate) (PET), a poly(butylene terephthalate) (PBT), or a poly(ethylene naphthalate) (PEN)] and a polycarbonate-series resin (e.g., a bisphenol A-based polycarbonate).

The transparent substrate film may be a single-layer film or may be a laminate film. The laminate film may have a plurality of the same type resin layers or may have a plurality of layers different in type from each other.

The transparent substrate film may be a non-stretched film or may be a stretched (monoaxially or biaxially stretched) film.

The transparent substrate film may have an adhesive layer (an adhesion layer), such as an anchor coat layer, on a surface thereof in order to improve the adhesion to the hardcoat layer. The transparent substrate film may be subjected to a surface treatment, e.g., a discharge treatment (such as corona discharge or glow discharge), an acid treatment, and a flame treatment. It is preferred that the surface of the transparent substrate film have an anchor coat layer formed from an adhesive or an agglutinant (such as an acrylic resin, a urethane-series resin, or a silicone-series resin) or be treated with a corona discharge. The transparent substrate film may further contain an adhesion improver in order to improve the adhesion.

The transparent substrate film may optionally contain an additive as far as the additive does not decrease the transparency of the transparent substrate film. The additive may include a stabilizer (such as an antioxidant, an ultraviolet absorber, a light stabilizer, or a heat stabilizer), a nucleation agent, a flame retardant, a flame-retardant auxiliary, a filler, a plasticizer, an impact modifier, a reinforcer, a coloring agent, a dispersing agent, an antistatic agent, a foaming agent, an antibacterial agent, and others. These additives may be used alone or in combination.

It is sufficient that the two-dimensional shaped article has a thickness of about not less than 1 μm without particular limitation. For example, the two-dimensional shaped article may have a thickness of about 1 μm to 100 mm, preferably about 20 μm to 10 mm, and more preferably about 50 to 1000 μm. The thickness of the transparent substrate film is not particularly limited to a specific one, and may be, for example, about 1 to 300 μm, preferably about 20 to 250 μm, and more preferably about 40 to 200 μm (particularly about 50 to 150 μm).

The hardcoat layer to be laminated on the two-dimensional shaped article has a thickness of, for example, about 0.1 to 100 μm (e.g., about 5 to 50 μm), preferably about 1 to 30 μm, and more preferably about 3 to 20 μm (particularly about 4 to 10 μm). A laminated product of a soft two-dimensional shaped article (such as a transparent substrate layer) and a hardcoat layer having such a thickness has an excellent flexibility, and thus the product can be produced by a roll-to-roll system. The product is therefore producible with a high production efficiency.

The shaped product having the hardcoat layer laminated on the surface of the transparent substrate film, which also has an excellent transparency, can be used for optional applications in the same manner as in the above-mentioned product having the hardcoat layer alone.

Each one of these shaped products (the sheet-like product formed from the hardcoat layer alone, and the laminate of the transparent substrate layer and the hardcoat layer) has an excellent transparency.

The shaped product (the hardcoat layer alone, or the laminate of the hardcoat layer and the transparent substrate layer) has a low haze (e.g., at a thickness of 50 μm) due to a high surface smoothness. The shaped product has a haze, for example, about 0.05 to 5%, preferably about 0.1 to 3% (e.g., about 0.15 to 2%), and more preferably about 0.2 to 1% (particularly about 0.3 to 0.8%) in accordance with Japanese Industrial Standards (JIS) K7136.

The shaped product has a total light transmittance (at a thickness of 50 μm) of, for example, about 70 to 100%, preferably about 80 to 100%, more preferably about 85 to 100% (e.g., about 85 to 98%), and particularly about 90 to 100% (e.g., about 90 to 95%) in accordance with JIS K7361.

The three-dimensional base (or shaped article) is not particularly limited to a specific one and may be a variety of three-dimensional bases (or shaped articles), each formed from an organic material or an inorganic material. The curable composition of the present invention has an excellent coating property and can form a uniform hardcoat layer on a complicated three-dimensional base. In order to improve the adhesion to the hardcoat layer, the surface of the three-dimensional base may also be subjected to a surface treatment in the same manner as in the transparent substrate film. The hardcoat layer has a thickness of, for example, about 0.1 to 100 μm (e.g., about 5 to 70 μm), preferably about 1 to 60 μm (e.g., about 1 to 30 μm), and more preferably about 10 to 50 μm (particularly about 30 to 40 μm).

In the shaped product, the hardcoat layer (the cured product of the curable composition) has a high surface hardness. The hardcoat layer has a pencil hardness (under 750 g load) of not lower than 3H (e.g., about 3H to 9H), preferably not lower than 4H (e.g., about 4H to 9H), and more preferably not lower than 5H (particularly about 5H to 9H) in accordance with JIS K5600. In particular, the hardcoat layer can have a pencil hardness of not lower than 7H (e.g., about 7H to 9H) and preferably not lower than 8H (e.g., about 8H to 9H) by regulating an aging step or others. The hardcoat layer can obtain a pencil hardness of 9H, which is equivalent to that of a glass. A hardcoat layer with an excessively small pencil hardness has a low abrasion resistance.

The hardcoat layer also has a high abrasion resistance. Even in a case where a #0000 steel wool with which a stick 1 cm in diameter is covered is allowed to go back and forth on the surface of the hardcoat layer 100 times under a load of 1.3 kg/cm$^2$, scratches do not result on the surface of the hardcoat layer.

The hardcoat layer has an excellent surface smoothness. The hardcoat layer has an arithmetic average roughness Ra of about 0.1 to 20 nm, preferably about 0.1 to 10 nm, and more preferably about 0.1 to 5 nm in accordance with JIS B0601.

The hardcoat layer also has an excellent surface sliding property. The hardcoat layer has a contact angle of water against a surface thereof is not less than 60°, for example, about 60 to 110°, preferably about 70 to 110°, and more preferably about 80 to 110°. A hardcoat layer having an excessively small contact angle of water against a surface thereof may a low abrasion resistance probably due to a low sliding property. The contact angle of water can be measured by an automatic dynamic contact angle meter ("Type DCA-UZ" manufactured by Kyowa Interface Science Co., Ltd.) or other means.

[Process for Producing Shaped Product]

The shaped product (coated shaped product or laminate) of the present invention is produced through a step of applying the curable composition on a support (a releasable support, or a two-dimensional or three-dimensional base (or shaped article)) and a step of curing the coated composition.

For the applying step, the method for applying the curable composition may include a conventional manner, for example, a roll coater, an air knife coater, a blade coater, a rod coater, a reverse coater, a bar coater, a comma coater, a dip and squeeze coater, a die coater, a gravure coater, a microgravure coater, a silkscreen coater, a dipping method, a spraying method, and a spinner method. Among these methods, a bar coater or a gravure coater is used widely.

In a case where the curable composition contains an organic solvent, or other cases, the curable composition may optionally be dried after applying. The curable composition may be dried at a temperature of about 40 to 150° C., preferably about 50 to 120° C., and more preferably about 60 to 100° C. (particularly about 60 to 80° C.). The drying time is not particularly limited to a specific one and can be selected from the range of about 30 seconds to one hour. In order to prepare a hardcoat layer having a pencil hardness equivalent to that of a glass, the drying time may be adjusted. The drying time may be not shorter than 3 minutes (e.g., about 3 minutes to one hour), preferably not shorter than 5 minutes (e.g., about 5 to 30 minutes), and more preferably not shorter than 8 minutes (e.g., about 8 to 20 minutes).

In the curing step, the curable composition may be cured by irradiation with active energy ray (or actinic ray) or by heating, depending on the species of the cationic polymerization initiator. Among them, the curable composition may usually be cured by irradiation with an active energy ray.

As the active energy ray, heat and/or a light energy ray may be used. In particular, the irradiation with the light energy ray is usable. As the light energy ray, there may be used a radioactive ray (such as gamma ray or X-ray), an ultraviolet ray, a visible ray, an electron beam (EB), and others. The light energy ray is usually an ultraviolet ray or an electron beam in practical cases. In particular, in a case where a sheet having a high weather resistance is produced, the electron beam irradiation may be used because of polymerization without any polymerization initiator.

For the ultraviolet ray, the light source may include, for example, a Deep UV lamp, a low-pressure mercury lamp, a high-pressure mercury lamp, a super high-pressure mercury lamp, a halogen lamp, and a laser light source (a light source, such as a helium-cadmium laser or an excimer laser). The quantity of the irradiation light (irradiation energy) varies depending on the thickness of the coated layer. The quantity of the irradiation light may for example be about 50 to 10000 mJ/cm$^2$, preferably about 70 to 5000 mJ/cm$^2$, and more preferably about 100 to 1000 mJ/cm$^2$. In order to improve the adhesion to the two- or three-dimensional base, the quantity of light or the irradiation time may be increased. The quantity of the irradiation light may for example be about 300 to 10000 mJ/cm$^2$ (particularly about 500 to 5000 mJ/cm$^2$).

For the electron beam, an exposure source (e.g., an electron beam irradiation apparatus) can be used for the electron beam irradiation. The radiation dose (dose) varies depending on the thickness of the coated layer. The radiation dose is, for example, about 1 to 200 kGy (kilogray), preferably about 5 to 150 kGy, and more preferably about 10 to 100 kGy (particularly about 20 to 80 kGy). The acceleration voltage is, for example, about 10 to 1000 kV, preferably about 50 to 500 kV, and more preferably about 100 to 300 kV.

The irradiation with the active energy ray (in particular, the electron beam) may optionally be conducted in an atmosphere of an inactive gas (for example, nitrogen gas, argon gas, and helium gas).

As the succeeding step after the curing step by the active energy ray, an aging step may be provided in which the cured hardcoat layer is heat-treated (annealed). In the aging step, the heating temperature is, for example, about 30 to 200° C., preferably about 50 to 190° C., and more preferably about 60 to 180° C. The heating time is, for example, about 10 minutes to 10 hours, preferably about 30 minutes to 5 hours, and more preferably 45 minutes to 3 hours. In particular, in a case where a hardcoat layer having a pencil hardness equivalent to that of a glass is prepared, it is preferred that the heating temperature be a lower temperature, for example, about 30 to 150° C., preferably about 50 to 120° C., more preferably about 60 to 100° C. (particularly about 65 to 90° C.) and the heating time be a longer time, for example, about 0.5 to 5 hours, preferably about 1 to 3 hours, and more preferably about 1.5 to 2.5 hours.

Meanwhile, in a case where the curable resin composition is thermally cured using a thermal cationic polymerization initiator, the heating temperature is, for example, about 30 to 200° C., preferably about 50 to 190° C., and more preferably about 60 to 180° C.

As the curing step, a curing step by the active energy ray (such as an ultraviolet ray) is preferred in view of applicability to various supports.

In particular, since the curable composition of the present invention and the cured product thereof each have an excellent flexibility, the combination use of the curable composition or cured product and a support having an excellent flexibility (such as a soft transparent substrate layer) allows the production of the shaped product by a roll-to-roll system. For example, the method of the roll-to-roll system may continuously conduct the following steps: a step of paying out a rolled support; a step of applying a curable composition on at least one side of the paid-out support, optionally removing a solvent by drying, and then curing the curable composition; and winding the resulting hardcoat film onto a roller.

The hardcoat sheet composed of the hardcoat layer alone can be obtained through a step of releasing a releasable support from the hardcoat layer.

EXAMPLES

The following examples are intended to describe this invention in further detail and should by no means be interpreted as defining the scope of the invention. Raw materials used for Examples and Comparative Examples are as follows. The hardcoat layers obtained in Examples and Comparative Examples were evaluated for the following items.

[Abbreviated Name of Raw Material]
(Curable Resin)

DPHA: dipentaerythritol hexaacrylate, "DPHA" manufactured by Daicel-Allnex Ltd.

IRR214K: tricyclodecanedimethanol diacrylate, "IRR214K" manufactured by Daicel-Allnex Ltd.

TA-100: acrylic silicone resin, "SQ TA-100" manufactured by Toagosei Co., Ltd.

SI-20: acrylic silicone resin, "SQ SI-20" manufactured by Toagosei Co., Ltd.

(Leveling Agent)

SILCLEAN3720: hydroxyl group-containing polyether-modified polydimethylsiloxane, "BYK SILCLEAN3720" manufactured by BYK Japan KK SILCLEAN3700: hydroxyl group-containing silicone-modified acrylic resin, "BYK SILCLEAN3700" manufactured by BYK Japan KK BYK370: polyester-modified hydroxyl group-containing polydimethylsiloxane, "BYK370" manufactured by BYK Japan KK OPTOOL DSX: fluorine compound having hydrolytically condensable group, "OPTOOL DSX" manufactured by Daikin Industries, Ltd.

SURFLON S-242: ethylene oxide adduct of fluorine compound, "SURFLON S-242" manufactured by AGC Seimi Chemical Co., Ltd.

SURFLON S-243: ethylene oxide adduct of fluorine compound, "SURFLON S-243" manufactured by AGC Seimi Chemical Co., Ltd.

SURFLON S-386: polymer of fluorine compound, "SURFLON S-386" manufactured by AGC Seimi Chemical Co., Ltd.

SURFLON S-651: polymer of fluorine compound, "SURFLON S-651" manufactured by AGC Seimi Chemical Co., Ltd.

(Polymerization Initiator)

CPI300PG: photoacid generator, a solution of triarylsulfonium fluoroalkylfluorophosphate in propylene glycol methyl ether acetate, "CPI300PG" manufactured by San-Apro Ltd.

SAN-AID SI-60S: thermal acid generator, arylsulfonium salt, "SAN-AID SI-60S" manufactured by Sanshin Chemical Industry Co., Ltd.

IRGACURE 184: photopolymerization initiator, "IRGACURE 184" manufactured by BASF Japan Ltd.

(Substrate)

PET film: poly(ethylene terephthalate) film having a hardcoat layer on a back side thereof, "0321E188 (WE98-)" manufactured by Mitsubishi Plastics, Inc.

[Heat Resistance (5% Weight Loss Temperature ($T_{d5}$))]

A hardcoat film was obtained in the same manner as in Examples except that a glass plate was used in place of a PET film. From the hardcoat film, about 5 mg of a hardcoat layer was cut with a cutter to give a sample. The sample was examined for the 5% weight loss temperature using a differential thermogravimetric analyzer ("TG/DTA6300" manufactured by Seiko Instruments Inc.) under the following conditions.

Measuring temperature range: 25 to 550° C.
Heating rate: 10° C./minute
Gas atmosphere: nitrogen

[Haze and Total Light Transmittance]

The haze and the total light transmittance were measured using a haze meter (trade name "NDH-5000W" manufactured by Nippon Denshoku Industries Co., Ltd.).

[Pencil Hardness]

The pencil hardness of the surface of the hardcoat layer obtained was measured under a load of 750 g in accordance with JIS K5600-5-4.

[Abrasion Resistance]

Using a durability tester provided with a stick 1.0 cm in diameter covered with a #0000 steel wool, the steel wool was allowed to go back and forth on the surface of the hardcoat layer 100 times (at velocity: 10 cm/s) under a load of 1.3 kgf/cm². Then the hardcoat film was pasted on a black acrylic plate with an optical agglutinant. The state of the surface was observed by a fluorescent tube provided with a three-band fluorescent lamp, and the number of scratches was counted.

[External Appearance]

The external appearance of the hardcoat film obtained was visually observed and evaluated on the basis of the following criteria.

A: The surface is smooth and highly lustrous.
B: The surface has a somewhat uneven thickness.
C: The surface has a significantly uneven thickness and is poorly lustrous.

Reference Example 1

(Preparation of Cationic Curable Silicone Resin)

In a 300-mL flask (reactor) equipped with a thermometer, a stirrer, a reflux condenser, and a nitrogen-introducing tube, 161.5 mmol (39.79 g) of 2-(3,4-epoxy)cyclohexylethyltrimethoxysilane, 9 mmol (1.69 g) of phenyltrimethoxysilane, and 165.9 g of acetone were put under a nitrogen flow and heated to 50° C. To the resulting mixture, 4.70 g of a 5% by weight aqueous solution of potassium carbonate (potassium carbonate: 1.7 mmol) was added dropwise over 5 minutes, and then 1700 mmol (30.60 g) of water was added dropwise thereto over 20 minutes. During the dropping, a marked increase in temperature did not occur. Thereafter, the polycondensation reaction was carried out for 4 hours under a nitrogen flow at a temperature of 50° C.

The analysis of the product in the reaction solution after the polycondensation reaction showed that the product had a number average molecular weight of 1911 and a degree of molecular weight dispersion (molecular weight distribution Mw/Mn) of 1.47. The ratio [the T3 unit/the T2 unit] of the T3 unit relative to the T2 unit in the product obtained was calculated by $^{29}$Si-NMR spectrometry and was determined to be 10.3.

Thereafter, the reaction solution was cooled, and washed with water until the lower layer solution was neutralized. The upper layer solution was separated and then distilled out the solvent under the conditions of 1 mmHg and 40° C. to give a colorless and transparent liquid product (a cationic curable silicone resin containing a silsesquioxane unit having an epoxy group). The product (ESQ) had a $T_{d5}$ of 370° C.

(Production of Hardcoat Film)

A mixture of 100 parts by weight of the cationic curable silicone resin (ESQ) obtained and 1 part by weight of a photoacid generator (CPI300PG) was prepared and used as a hardcoat liquid (curable composition).

The hardcoat liquid obtained was cast-coated on a PET film with the use of a wire bar #30 and then allowed to stand for one minute in an oven at 70° C. (prebaking). Then, the coated film was irradiated with an ultraviolet ray at a radiation dose of 400 mJ/cm² for 5 seconds with a high-pressure mercury lamp (manufactured by Eyegraphics Co., Ltd.). Finally, the coating of the hardcoat liquid was cured by heat-treating (aging) the film at 150° C. for one hour to give a hardcoat film having a hardcoat layer. The hardcoat layer had a thickness of 38 µm.

Reference Example 2

A hardcoat film was produced in the same manner as in Reference Example 1 except that the cast-coated hardcoat liquid was prebaked for 10 minutes in an oven at 70° C. and heat-treated (aged) at 80° C. for 2 hours. The hardcoat layer had a thickness of 36 µm.

Examples 1 to 4

As shown in Table 1, a hardcoat film was produced in the same manner as in Reference Example 2 except that a leveling agent, as a raw material, was further added for the preparation of the cationic curable silicone resin.

Examples 5 to 11

As shown in Table 1, a hardcoat film was produced in the same manner as in Reference Example 1 except that a leveling agent, as a raw material, was further added for the preparation of the cationic curable silicone resin.

Example 12

A mixture of 100 parts by weight of the curable silicone resin (ESQ) obtained in Reference Example 1, 0.3 parts by weight of a thermal acid generator (SAN-AID SI-60S), and 0.5 parts by weight of a leveling agent (SURFLON S-243) was prepared and used as a hardcoat liquid.

The hardcoat liquid obtained was cast-coated on a PET film with the use of a wire bar #30 and then allowed to stand for one minute in an oven at 70° C. (prebaking). Then, the coating of the hardcoat liquid was cured by heat-treating the film at 150° C. for one hour to give a hardcoat film having a hardcoat layer. The hardcoat layer had a thickness of 36 µm.

Comparative Examples 1 to 4

As shown in Table 1, a hardcoat film was produced in the same manner as in Reference Example 1 except that a curable resin and a polymerization initiator were mixed to prepare a hardcoat liquid.

The evaluation of the hardcoat films obtained in Examples, Reference Examples, and Comparative Examples are shown in Table 1.

TABLE 1

| | | | Reference Examples | | Examples | | | | | | |
|---|---|---|---|---|---|---|---|---|---|---|---|
| | | | 1 | 2 | 1 | 2 | 3 | 4 | 5 | 6 | 7 |
| Composition (parts by weight) | Curable resin | ESQ | 100 | 100 | 100 | 100 | 100 | 100 | 100 | 100 | 100 |
| | | PETIA | — | — | — | — | — | — | — | — | — |
| | | IRR214K | — | — | — | — | — | — | — | — | — |
| | | TA-100 | — | — | — | — | — | — | — | — | — |
| | | SI-20 | — | — | — | — | — | — | — | — | — |
| | Levelling agent | SILCLEAN3720 | — | — | — | — | — | — | 1 | — | — |
| | | SILCLEAN3700 | — | — | 1 | — | — | — | — | 1 | — |
| | | BYK300 | — | — | — | — | — | — | — | — | 1 |
| | | OPTOOL DSX | — | — | — | — | — | — | — | — | — |
| | | SURFLON S-242 | — | — | — | — | — | — | — | — | — |
| | | SURFLON S-243 | — | — | — | 0.5 | — | — | — | — | — |
| | | SURFLON S-386 | — | — | — | — | 0.5 | — | — | — | — |
| | | SURFLON S-651 | — | — | — | — | — | 0.5 | — | — | — |
| | Initiator | CPI-300PG | 1 | 1 | 1 | 1 | 1 | 1 | 1 | 1 | 1 |
| | | SAN-AID SI-60S | — | — | — | — | — | — | — | — | — |
| | | IRGACURE 184 | — | — | — | — | — | — | — | — | — |
| | Thickness (µm) | | 38 | 36 | 34 | 33 | 30 | 35 | 35 | 37 | 35 |
| | Haze (%) | | 0.5 | 0.5 | 0.5 | 0.4 | 0.2 | 0.2 | 0.5 | 0.6 | 0.4 |
| | Total light transmittance (%) | | 91.3 | 91 | 91 | 91 | 91.1 | 91.1 | 91.2 | 91.1 | 91.2 |
| | Pencil hardness | | 4H | 9H | 8H | 8H | 9H | 8H | 5H | 5H | 5H |
| | Abrasion resistance (Number of scratches) | | about 10 | about 10 | 0 | 0 | 0 | 0 | 0 | 0 | 0 |
| | External appearance | | B | B | A | A | A | A | A | A | A |

| | | | Examples | | | | | Comparative Examples | | | |
|---|---|---|---|---|---|---|---|---|---|---|---|
| | | | 8 | 9 | 10 | 11 | 12 | 1 | 2 | 3 | 4 |
| Composition (parts by weight) | Curable resin | ESQ | 100 | 100 | 100 | 100 | 100 | — | — | — | — |
| | | PETIA | — | — | — | — | — | 100 | — | — | — |
| | | IRR214K | — | — | — | — | — | — | 100 | — | — |
| | | TA-100 | — | — | — | — | — | — | — | 100 | — |
| | | SI-20 | — | — | — | — | — | — | — | — | 100 |
| | Levelling agent | SILCLEAN3720 | — | — | — | — | — | — | — | — | — |
| | | SILCLEAN3700 | — | — | — | — | — | — | — | — | — |
| | | BYK300 | — | — | — | — | — | — | — | — | — |
| | | OPTOOL DSX | 0.5 | — | — | — | — | — | — | — | — |
| | | SURFLON S-242 | — | 0.5 | — | — | — | — | — | — | — |
| | | SURFLON S-243 | — | — | 0.5 | — | 0.5 | — | — | — | — |
| | | SURFLON S-386 | — | — | — | 0.5 | — | — | — | — | — |
| | | SURFLON S-651 | — | — | — | — | — | — | — | — | — |

TABLE 1-continued

| | | | | | | | | | | |
|---|---|---|---|---|---|---|---|---|---|---|
| Initiator | CPI-300PG | 1 | 1 | 1 | 1 | — | — | — | 3 | 3 |
| | SAN-AID SI-60S | — | — | — | — | 0.3 | — | — | — | — |
| | IRGACURE 184 | — | — | — | — | — | 5 | 5 | — | — |
| Thickness (μm) | | 38 | 36 | 34 | 35 | 36 | 35 | 32 | 40 | 37 |
| Haze (%) | | 0.3 | 0.5 | 0.3 | 0.3 | 0.5 | 0.4 | 0.4 | 1.2 | 0.8 |
| Total light transmittance (%) | | 91 | 91.1 | 91 | 91.2 | 90.8 | 90 | 90.2 | 90.5 | 91.5 |
| Pencil hardness | | 5H | 5H | 5H | 5H | 5H | 3H | H | 2H | 2H |
| Abrasion resistance (Number of scratches) | | 0 | 0 | 0 | 0 | 0 | large number | large number | large number | large number |
| External appearance | | A | A | A | A | B | C | C | C | C |

As apparent from the results shown in Table 1, the hardcoat films obtained in Examples were excellent transparency, hardness, abrasion resistance, and external appearance. In contrast, the hardcoat films obtained in Comparative Examples had small hardness and low abrasion resistance and external appearance.

INDUSTRIAL APPLICABILITY

The cured hardcoat layer of the curable composition of the present invention is utilizable as a hardcoat layer for coating various bases (or shaped articles) (two-dimensional or three-dimensional bases (or shaped articles)) that require properties including abrasion resistance, heat resistance, surface smoothness, and antifouling property. The cured hardcoat layer, which has an excellent optical properties including transparency, is also utilizable for a display unit of various optical displays [for example, electric or electronic equipment or precision equipment (e.g., a personal computer, a television, a portable telephone (e.g., a smart phone), a tablet computer, a game machine, a mobile device, a clock or a watch, and an electronic calculator)], an automobile windshield, and a window of a building.

The invention claimed is:

1. A shaped product comprising a hardcoat layer having a pencil hardness of 4H to 9H in accordance with JIS K 5600, wherein the hardcoat layer is a cured product of a curable composition comprising a cationic curable silicone resin and a leveling agent,
wherein the cationic curable silicone resin comprises a silsesquioxane unit and a unit represented by the formula (2): $R^1SiO(OR^2)$
wherein $R^1$ represents a group comprising an epoxy group; a hydrogen atom; or a hydrocarbon group; and $R^2$ represents a hydrogen atom or a $C_{1-4}$alkyl group; and
has a molar ratio of the silsesquioxane unit relative to the unit represented by the formula (2) of 7 to 18, has a monomer unit having an epoxy group in a proportion of not less than 50% by mol in a total monomer unit, and has a number average molecular weight of 1000 to 3000,
wherein the leveling agent comprises a fluorine-containing leveling agent having a reactive group to an epoxy group, and a hydrolytically condensable group.

2. A shaped product according to claim 1, wherein the cationic curable silicone resin has a silsesquioxane unit represented by the formula (1): $R^1SiO_{3/2}$
wherein $R^1$ represents a group comprising an epoxy group; a hydrogen atom; or a hydrocarbon group;
in a proportion of not less than 50% by mol in the total monomer unit constituting the cationic curable silicone resin.

3. A shaped product according to claim 1, wherein the silsesquioxane unit comprises a unit represented by the formula (3): $R^3SiO_{3/2}$
wherein $R^3$ represents a group comprising an alicyclic epoxy group, and
a unit represented by the formula (4): $R^4SiO_{3/2}$
wherein $R^4$ represents an aryl group which may have a substituent.

4. A shaped product according to claim 1, wherein the cationic curable silicone resin has a molecular weight distribution Mw/Mn of 1 to 3.

5. A shaped product according to claim 1, wherein the leveling agent has a proportion of 0.1 to 10 parts by weight relative to 100 parts by weight of the cationic curable silicone resin.

6. A shaped product according to claim 1, which comprises the hardcoat layer alone and has an average thickness of 10 to 200 μm.

7. A shaped product according to claim 1, which further comprises a transparent substrate layer, wherein the transparent substrate layer has a side provided with the hardcoat layer.

8. A shaped product according to claim 6, which is produced by a roll-to-roll system.

9. A shaped product according to claim 1, which comprises the hardcoat layer and a three-dimensional base.

* * * * *